(12) United States Patent
Hoshino et al.

(10) Patent No.: US 10,099,204 B2
(45) Date of Patent: Oct. 16, 2018

(54) EXHAUST GAS-PURIFYING CATALYST

(71) Applicant: Cataler Corporation, Kakegawa-shi, Shizuoka (JP)

(72) Inventors: Sho Hoshino, Kakegawa (JP); Akimasa Hirai, Kakegawa (JP); Kenichi Taki, Kakegawa (JP); Satoshi Matsueda, Kakegawa (JP); Yuji Yabuzaki, Kakegawa (JP)

(73) Assignee: CATALER CORPORATION, Kakegawa-shi (JP)

( * ) Notice: Subject to any disclaimer, the term of this patent is extended or adjusted under 35 U.S.C. 154(b) by 0 days.

(21) Appl. No.: 15/482,961

(22) Filed: Apr. 10, 2017

(65) Prior Publication Data

US 2017/0297004 A1    Oct. 19, 2017

(30) Foreign Application Priority Data

Apr. 13, 2016 (JP) .................. 2016-080359

(51) Int. Cl.
| | | |
|---|---|---|
| *B01J 23/00* | (2006.01) | |
| *B01J 23/46* | (2006.01) | |
| *B01J 23/44* | (2006.01) | |
| *B01J 23/10* | (2006.01) | |
| *B01J 21/06* | (2006.01) | |

(Continued)

(52) U.S. Cl.
CPC .......... *B01J 23/464* (2013.01); *B01D 53/945* (2013.01); *B01J 21/063* (2013.01); *B01J 21/12* (2013.01); *B01J 23/10* (2013.01); *B01J 23/30* (2013.01); *B01J 23/44* (2013.01); *B01J 35/0006* (2013.01); *B01J 35/04* (2013.01); *B01J 37/0215* (2013.01); *B01J 37/0236* (2013.01); *B01J 37/04* (2013.01); *F01N 3/10* (2013.01); *B01D 2255/1021* (2013.01); *B01D 2255/1023* (2013.01); *B01D 2255/1025* (2013.01); *B01D 2255/902* (2013.01); *B01D 2255/908* (2013.01);

(Continued)

(58) Field of Classification Search
CPC ...... B01J 23/464; B01J 35/04; B01J 37/0236; B01J 37/0215; B01J 37/04; B01J 35/0006; B01J 21/12; B01J 23/30; B01J 21/063; B01J 23/10; B01J 23/44; B01D 53/945; B01D 2255/1025; B01D 2255/902; B01D 2255/9202; B01D 2255/1021; B01D 2255/1023; B01D 2255/908; F01N 3/10; F01N 2370/02; F01N 2510/0684
See application file for complete search history.

(56) References Cited

U.S. PATENT DOCUMENTS

2011/0245076 A1* 10/2011 Matsueda ............ B01D 53/945
502/328

FOREIGN PATENT DOCUMENTS

| | | | |
|---|---|---|---|
| EP | 1470859 A1 * | 10/2004 | ......... B01D 53/9422 |
| JP | 2004-321847 A | 11/2004 | |

* cited by examiner

*Primary Examiner* — Haytham Soliman
(74) *Attorney, Agent, or Firm* — John P. White; Cooper & Dunham LLP

(57) ABSTRACT

An exhaust gas-purifying catalyst of the present invention comprises a substrate, and one or more catalytic layers provided on the substrate, wherein at least one of the catalytic layers (i) contains a precious metal, alumina, and an acidic oxide element, (ii) has a correlation coefficient $\rho_{Al,AE}$ of 0.70 or more, and (iii) has a correlation coefficient $\rho_{PM,AE}$ of 0.70 or more.

9 Claims, 3 Drawing Sheets

(51) Int. Cl.
    *B01J 23/30*     (2006.01)
    *B01J 21/12*     (2006.01)
    *B01J 35/00*     (2006.01)
    *B01J 35/04*     (2006.01)
    *B01J 37/04*     (2006.01)
    *B01J 37/02*     (2006.01)
    *B01D 53/94*     (2006.01)
    *F01N 3/10*     (2006.01)

(52) U.S. Cl.
    CPC .. *B01D 2255/9202* (2013.01); *F01N 2370/02* (2013.01); *F01N 2510/0684* (2013.01)

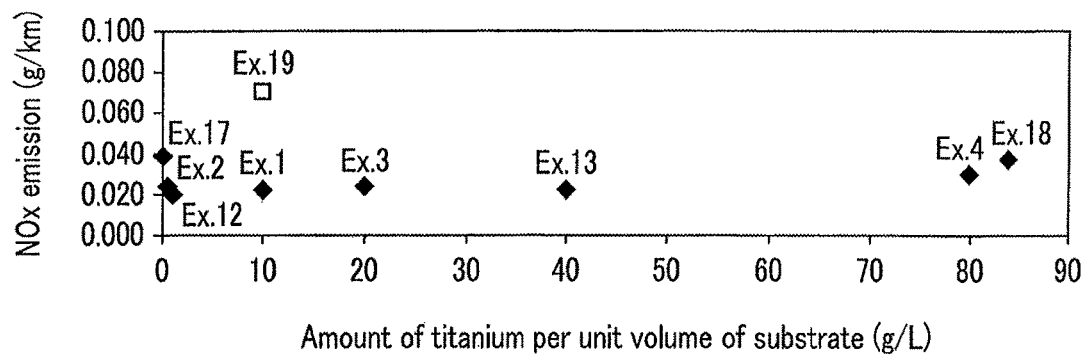
F I G. 5
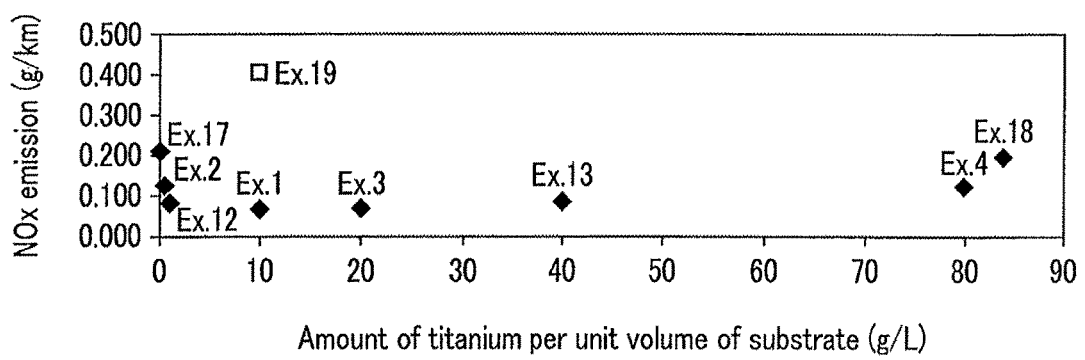
F I G. 6

EXHAUST GAS-PURIFYING CATALYST

CROSS-REFERENCE TO RELATED APPLICATION

This application is based upon and claims the benefit of priority from Japanese Patent Application No. 2016-080359, filed Apr. 13, 2016, the entire contents of which are incorporated herein by reference.

BACKGROUND OF THE INVENTION

1. Field of the Invention

The present invention relates to an exhaust gas-purifying catalyst.

2. Description of the Related Art

Emission controls on automobiles or the like have been tightened in recent years. Therefore, in order to address this issue, various exhaust gas-purifying catalysts for purifying hydrocarbons (HC), carbon monoxide (CO), nitrogen oxides ($NO_X$) or the like contained in an exhaust gas have been developed.

Most exhaust gas-purifying catalysts contain precious metals as catalytic metals. The precious metals play a role in promoting oxidation reactions of HC and CO and reductive reactions of $NO_X$.

The precious metals, however, have a problem that they are susceptible to poisoning by sulfur in the exhaust gas. When the precious metals are poisoned by sulfur, the catalytic performance of the precious metal is deteriorated. Then, in order to suppress the sulfur poisoning of the precious metal, proposed is a technique in which an acidic oxide such as titanium dioxide is added to a catalyst containing precious metals (see, for example, Jpn. Pat. Appln. KOKAI Publication No. 2004-321847).

The exhaust gas-purifying catalysts, however, have room for further improvement in the exhaust gas-purification performances.

BRIEF SUMMARY OF THE INVENTION

An object of the present invention is to provide a technique that makes it possible to achieve a higher performance in purifying exhaust gas.

According to an aspect of the present invention, there is provided an exhaust gas-purifying catalyst comprising:
a substrate, and one or more catalytic layers provided on the substrate,
wherein at least one of the catalytic layers (i) contains a precious metal, alumina, and an acidic oxide element; (ii) has a correlation coefficient $\rho_{Al,AE}$ calculated by the following formula (1) of 0.70 or more; and (iii) has a correlation coefficient $\rho_{PM,AE}$ calculated by the following formula (7) of 0.70 or more, $$\rho_{Al,AE} = \frac{C_{Al,AE}}{\sigma_{Al}\sigma_{AE}} \quad (1)$$

wherein $C_{Al,AE}$, $\sigma_{Al}$, and $\sigma_{AE}$ in the formula (1) are represented by the following formulae (2), (3) and (4), respectively:

$$C_{Al,AE} = \frac{1}{350}\sum_{i=1}^{350}(I_{Al,i} - I_{Al,av})(I_{AE,i} - I_{AE,av}) \quad (2)$$

$$\sigma_{Al} = \sqrt{\frac{1}{350}\sum_{i=1}^{350}(I_{Al,i} - I_{Al,av})^2} \quad (3)$$

$$\sigma_{AE} = \sqrt{\frac{1}{350}\sum_{i=1}^{350}(I_{AE,i} - I_{AE,av})^2} \quad (4)$$

in the formulae (2) to (4),
i is a natural number of from 1 to 350,
$I_{Al,i}$ is a characteristic X-ray intensity of aluminum measured using an electron beam microanalyzer at an i-th intersection point among 350 intersection points of planes and a line perpendicular to a main surface of the catalytic layer, the planes being obtained by dividing the catalytic layer into 350 equal parts in a thickness direction,
$I_{Al,av}$ is an arithmetic average value of the $I_{Al,i}$ calculated by the following formula (5):

$$I_{Al,av} = \frac{1}{350}\sum_{i=1}^{350} I_{Al,i} \quad (5)$$

$I_{AE,i}$ is a characteristic X-ray intensity of the acidic oxide element measured using the electron beam microanalyzer at the i-th intersection point, and
$I_{AE,av}$ is an arithmetic average value of the $I_{AE,i}$ calculated by the following formula (6):

$$I_{AE,av} = \frac{1}{350}\sum_{i=1}^{350} I_{AE,i} \quad (6)$$

$$\rho_{PM,AE} = \frac{C_{PM,AE}}{\sigma_{PM}\sigma_{AE}} \quad (7)$$

wherein $C_{PM,AE}$, $\sigma_{PM}$ and $\sigma_{AE}$ in the formula (7) are represented by the following formulae (8), (9) and (10), respectively:

$$C_{PM,AE} = \frac{1}{350}\sum_{i=1}^{350}(I_{PM,i} - I_{PM,av})(I_{AE,i} - I_{AE,av}) \quad (8)$$

$$\sigma_{PM} = \sqrt{\frac{1}{350}\sum_{i=1}^{350}(I_{PM,i} - I_{PM,av})^2} \quad (9)$$

$$\sigma_{AE} = \sqrt{\frac{1}{350}\sum_{i=1}^{350}(I_{AE,i} - I_{AE,av})^2} \quad (10)$$

in the formulae (8) to (10),
i is a natural number of from 1 to 350,
$I_{PM,i}$ is a characteristic X-ray intensity of the precious metal measured using the electron beam microanalyzer at the i-th intersection point among 350 intersection points of planes and a line perpendicular to a main surface of the catalytic layer, the planes being obtained by dividing the catalytic layer into 350 equal parts in a thickness direction,
$I_{PM,av}$ is an arithmetic average value of the $I_{PM,i}$ calculated by the following formula (11):

$$I_{PM,av} = \frac{1}{350}\sum_{i=1}^{350} I_{PM,i} \quad (11)$$

$I_{AE,i}$ is a characteristic X-ray intensity of the acidic oxide element measured using the electron beam microanalyzer at the i-th intersection point, and $I_{AE,av}$ is an arithmetic average value of the $I_{AE,i}$ calculated by the following formula (12):

$$I_{AE,av} = \frac{1}{350}\sum_{i=1}^{350} I_{AE,i} \quad (12)$$

BRIEF DESCRIPTION OF THE SEVERAL VIEWS OF THE DRAWING

FIG. 5 is a graph showing the relationship between the amount of titanium per a unit volume of a substrate and $NO_x$ emission; and FIG. 6 is a graph showing the relationship between the amount of titanium per a unit volume of a substrate and $NO_x$ emission.

DETAILED DESCRIPTION OF THE INVENTION

Figure 1:
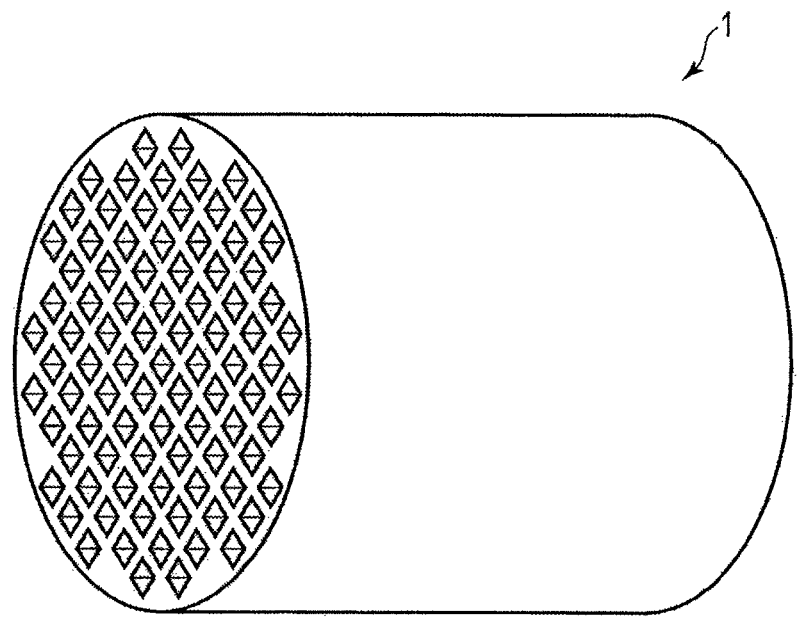
FIG. 1 is a perspective view schematically showing an exhaust gas-purifying catalyst according to a first embodiment of the present invention.

Embodiments of the present invention will be described in detail below with reference to the drawings. In all the drawings, elements that are the same or similar in function are given the same reference characters, and their description will not be repeated.

Figure 2:
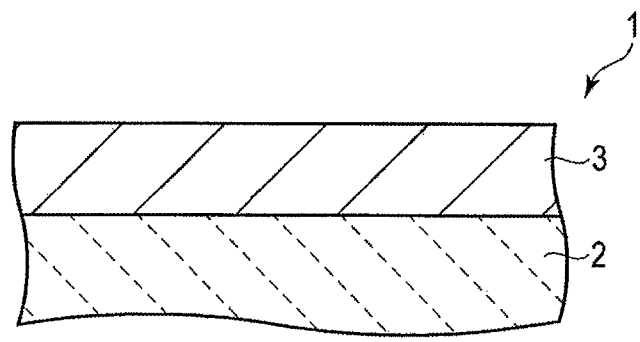
FIG. 2 is an enlarged cross-sectional view showing a part of the exhaust gas-purifying catalyst shown in FIG. 1.

FIG. 1 is a perspective view schematically showing an exhaust gas-purifying catalyst according to a first embodiment of the present invention. FIG. 2 is an enlarged cross-sectional view showing a part of the exhaust gas-purifying catalyst shown in FIG. 1. An exhaust gas-purifying catalyst 1 shown in FIGS. 1 and 2 is a monolith catalyst. The exhaust gas-purifying catalyst 1 contains a substrate 2 such as a monolith honeycomb substrate. Typically, the substrate 2 is made of ceramic such as cordierite.

A catalytic layer 3 is formed on a partition wall of the substrate 2. The catalytic layer 3 contains a precious metal, alumina, and an acidic oxide element.

The precious metal is, for example, a platinum group, and is generally rhodium, palladium, platinum, or a combination thereof. The precious metal is present in the form of precious metal particles, and has, for example, a particle size of from 0.1 to 500 nm. Typically, the precious metals are supported on alumina particles, and play a role as a catalyst in oxidation reactions of HC and CO and reductive reactions of $NO_x$.

Typically, alumina is present in the form of a secondary particle formed by the aggregation of alumina particles. Each of the alumina particles has, for example, a particle size of from 0.1 to 500 nm. The secondary particle has, for example, a particle size of from 1 to 50 μm. The alumina supports the precious metal, and plays a role in increasing the specific surface area of the precious metal and dissipating heat generated by the reactions to suppress the sintering of the precious metal.

The acidic oxide element means an element other than oxygen contained in an acidic oxide. Typically, the acidic oxide element is titanium, tungsten, or silicon. Typically, the acidic oxide element is present in the form of primary particles containing the acidic oxide element, and has, for example, a particle size of from 0.1 to 500 nm. The acidic oxide element plays a role in suppressing the sulfur poisoning of the precious metal.

Typically, the acidic oxide element is uniformly distributed in a secondary particle formed by the aggregation of alumina particles. That is, the acidic oxide element is present in a high dispersion state in the secondary particle formed by the aggregation of alumina particles.

The uniformity (dispersibility) of the distribution of the acidic oxide element in the catalytic layer 3 is evaluated as follows.

First, supposed are m planes that are obtained by dividing the region between the surface of the catalytic layer 3 and the surface of the catalytic layer 3 located on the substrate 2 side into 350 equal parts. Then, 350 intersection points of these m planes and a straight line that is perpendicular to the surface of the catalytic layer 3 are supposed. Hereinafter, these 350 intersection points are referred to as points $P_i$ (i=1, 2, . . . , 350, hereinafter the same).

Then, using an electron beam microanalyzer (EPMA), a characteristic X-ray intensity $I_{Al,i}$ of aluminum (Al) and a characteristic X-ray intensity $I_{AE,i}$ of the acidic oxide element are measured on each of these 350 points $P_i$. Then, a correlation coefficient $\rho_{Al,AE}$ given by the following formula (1) is obtained based on these measurement values.

$$\rho_{Al,AE} = \frac{C_{Al,AE}}{\sigma_{Al}\sigma_{AE}} \quad (1)$$

In the above formula, $C_{Al,AE}$ is a covariance of the intensity $I_{Al,i}$ and the intensity $I_{AE,i}$; $\sigma_{Al}$ is the standard deviation of the intensity $I_{Al,i}$; and $\sigma_{AE}$ is the standard deviation of the intensity $I_{AE,i}$. The covariance $C_{Al,AE}$, the standard deviations $\sigma_{Al}$, and $\sigma_{AE}$ are given by the following formulae (2) to (4), respectively.

$$C_{Al,AE} = \frac{1}{350}\sum_{i=1}^{350}(I_{Al,i} - I_{Al,av})(I_{AE,i} - I_{AE,av}) \quad (2)$$

$$\sigma_{Al} = \sqrt{\frac{1}{350}\sum_{i=1}^{350}(I_{Al,i} - I_{Al,av})^2} \quad (3)$$

$$\sigma_{AE} = \sqrt{\frac{1}{350}\sum_{i=1}^{350}(I_{AE,i} - I_{AE,av})^2} \quad (4)$$

In each of the above formulae, $I_{Al,av}$ is the arithmetic average value of the intensity $I_{Al,i}$ given by the following formula (5), and $I_{AE,av}$ is the arithmetic average value of the intensity $I_{AE,i}$ given by the following formula (6).

$$I_{Al,av} = \frac{1}{350} \sum_{i=1}^{350} I_{Al,i} \qquad (5)$$

$$I_{AE,av} = \frac{1}{350} \sum_{i=1}^{350} I_{AE,i} \qquad (6)$$

The correlation coefficient $\rho_{Al,AE}$ represented by the above formula serves as an indicator that shows the correlation between the distribution of aluminum and the distribution of the acidic oxide element in the catalytic layer 3. That is, in the case where the acidic oxide element is distributed in the catalytic layer 3 with a relatively high uniformity, the correlation coefficient $\rho_{Al,AE}$ is a large positive value of 1 or less. On the other hand, in the case where the acidic oxide element is distributed in the catalytic layer 3 with a relatively low uniformity, the correlation coefficient $\rho_{Al,AE}$ is a small positive value close to 0.

Thus, by using the correlation coefficient $\rho_{Al,AE}$, the uniformity of the acidic oxide element distribution in the catalytic layer 3 can be evaluated. In the exhaust gas-purifying catalyst 1, the correlation coefficient $\rho_{Al,AE}$ of the catalytic layer 3 is a large positive value of 1 or less. That is, in the catalytic layer 3 of the exhaust gas-purifying catalyst 1, the acidic oxide element is distributed with a relatively high uniformity.

In the exhaust gas-purifying catalyst 1, the correlation coefficient $\rho_{Al,AE}$ of the catalytic layer 3 is 0.70 or more, preferably 0.75 or more, and more preferably 0.80 or more. The upper limit of the correlation coefficient $\rho_{Al,AE}$ of the catalytic layer 3 is 1.00.

The acidic oxide element is uniformly distributed in the secondary particle formed by the aggregation of the alumina particles. As a result, the acidic oxide element and the precious metal supported on the alumina particles are present close to each other. The proximity of the acidic oxide element and the precious metal is evaluated as follows.

First, using an electron beam microanalyzer (EPMA), a characteristic X-ray intensity $I_{PM,i}$ of the precious metal and a characteristic X-ray intensity $I_{AE,i}$ of the acidic oxide element are measured on each of the above-described 350 points $P_i$. The correlation coefficient $\rho_{PM,AE}$ given by the following formula (7) is obtained based on these measurement values.

$$\rho_{PM,AE} = \frac{C_{PM,AE}}{\sigma_{PM} \sigma_{AE}} \qquad (7)$$

In the above formula (7), $C_{PM,AE}$ and $\sigma_{PM}$ are represented by the following formulae (8) and (9), respectively. Furthermore, $\sigma_{AE}$ is represented by the above formula (4).

$$C_{PM,AE} = \frac{1}{350} \sum_{i=1}^{350} (I_{PM,i} - I_{PM,av})(I_{AE,i} - I_{AE,av}) \qquad (8)$$

$$\sigma_{PM} = \sqrt{\frac{1}{350} \sum_{i=1}^{350} (I_{PM,i} - I_{PM,av})^2} \qquad (9)$$

In each of the above formulae, $I_{PM,av}$ is the arithmetic average value of the intensity $I_{Al,i}$ given by the following formula (11), and $I_{AE,av}$ is the arithmetic average value of the intensity $I_{AE,i}$ given by the above formula (6).

$$I_{PM,av} = \frac{1}{350} \sum_{i=1}^{350} I_{PM,i} \qquad (11)$$

The correlation coefficient $\rho_{PM,AE}$ thus obtained serves as an indicator that shows the correlation between the distribution of the precious metal and the distribution of the acidic oxide element in the catalytic layer 3. That is, in the case where the precious metal and the acidic oxide element are distributed close to each other in the catalytic layer 3, the correlation coefficient $\rho_{PM,AE}$ is a large positive value of 1 or less. On the other hand, in the case where the precious metal and the acidic oxide element are distributed not close to each other, the correlation coefficient $\rho_{PM,AE}$ is a small positive value close to 0.

Thus, by using the correlation coefficient $\rho_{PM,AE}$, the proximity of the precious metal and the acidic oxide element in the catalytic layer 3 can be evaluated. In the exhaust gas-purifying catalyst 1, the correlation coefficient $\rho_{PM,AE}$ of the catalytic layer 3 is a large positive value of 1 or less. That is, in the catalytic layer 3 of the exhaust gas-purifying catalyst 1, the precious metal and the acidic oxide element are distributed close to each other.

In the exhaust gas-purifying catalyst 1, the correlation coefficient $\rho_{PM,AE}$ of the catalytic layer 3 is 0.70 or more, preferably 0.75 or more, and more preferably 0.80 or more. The upper limit of the correlation coefficient $\rho_{PM,AE}$ of the catalytic layer 3 is 1.00.

As described above, the acidic oxide element is uniformly distributed in the secondary particle formed by the aggregation of the alumina particles in the catalytic layer 3. As a result, the acidic oxide element and the precious metal supported on the alumina particles are present close to each other. The acidic oxide element and the precious metal are present close to each other, which can efficiently suppress the sulfur poisoning of the precious metal. Thereby, the exhaust gas-purifying catalyst including the catalytic layer can achieve a higher performance in purifying exhaust gas.

The state where the acidic oxide element is uniformly distributed in the secondary particle of alumina in the catalytic layer 3 can be produced by previously doping the alumina with the acidic oxide element, and forming the catalytic layer using the alumina doped with the acidic oxide element.

The alumina doped with the acidic oxide element can be prepared as follows, for example. When the acidic oxide element is titanium, aluminum nitrate and citric acid are first added to ion exchange water, and a titanium isopropoxide solution in n-propyl alcohol is then added thereto, followed by mixing. Next, hydrazine is added to the mixed solution. Then, the reaction system is stirred with heating to obtain a precipitate. The precipitate is separated by filtering, and the obtained filter cake is dried. The obtained solid is then fired. Thus, the alumina doped with the titanium can be obtained.

The alumina doped with the acidic oxide element has a structure where the acidic oxide element is located inside each of the alumina particles. These acidic oxide elements may replace a part of atoms constituting the crystal lattice of alumina, or may be located in voids between these atoms. Alternatively, while a part of the acidic oxide elements replace a part of atoms constituting the crystal lattice of alumina, the other part of the acidic oxide elements may be located in voids between these atoms.

The exhaust gas-purifying catalyst 1 can be manufactured by applying a slurry containing both the alumina doped with the acidic oxide element and the precious metal on the substrate 2 to form the catalytic layer 3.

On the other hand, when a catalytic layer is formed using a slurry containing a mixture of alumina, an acidic oxide element, and a precious metal without using the alumina doped with the acidic oxide element, the ratio of the acidic oxide element that is present close to the precious metal is decreased (see Examples 19 and 20 to be described later). The acidic oxide element that is not present close to the precious metal does not contribute to the suppression of the sulfur poisoning of the precious metal. Therefore, as the ratio of the acidic oxide element that is present close to the precious metal is decreased, the performance of the catalyst in purifying exhaust gas may be deteriorated.

In the exhaust gas-purifying catalyst 1, the content of the acidic oxide element per the unit volume of the substrate 2 is, for example, within a range of from 0.5 g/L to 80 g/L, and typically within a range of from 1 g/L to 40 g/L. When the content is less than 0.5 g/L, the sulfur poisoning of the precious metal may be insufficiently suppressed by the acidic oxide element. When the content is more than 80 g/L, the heat resistance of the catalytic layer 3 is deteriorated, which may be apt to cause the aggregation of the precious metal.

In the exhaust gas-purifying catalyst 1, the content of the acidic oxide element is, for example, within a range of from 0.5% by mass to 20% by mass, and typically within a range of from 1% by mass to 10% by mass, based on the total mass of the alumina and the acidic oxide element. When the content is less than 0.1% by mass, the sulfur poisoning of the precious metal may be insufficiently suppressed by the acidic oxide element. When the content is more than 20% by mass, the heat resistance of the alumina is deteriorated, which may be apt to cause the aggregation of the precious metal.

In the exhaust gas-purifying catalyst 1, the mass ratio of the content of the acidic oxide element to the content of the precious metal is, for example, within a range of from 0.5 to 80, and typically within a range of from 0.5 to 40. When the mass ratio is less than 0.5, the sulfur poisoning of the precious metal may be insufficiently suppressed by the acidic oxide element. The mass ratio of more than 80 may be apt to cause the aggregation of the precious metal.

The acidic oxide element contained in the catalytic layer 3 is preferably contained in a raw material slurry in the form of alumina doped with the total amount of the acidic oxide element. A part of the acidic oxide element may be contained in the raw material slurry without doping the alumina therewith as long as the formed catalytic layer 3 satisfies the correlation coefficients $\rho_{Al,AE}$ and $\rho_{PM,AE}$ of 0.7 or more.

The catalytic layer 3 can contain other components in addition to the precious metal, the alumina, and the acidic oxide element.

The catalytic layer 3 may further contain an oxygen storage material. The oxygen storage material stores oxygen under an oxygen-rich condition and emits oxygen under an oxygen-lean condition so as to optimize the oxidation reactions of HC and CO and the reductive reactions of $NO_x$. The oxygen storage material is in the form of particles, for example. As the oxygen storage material, for example, cerium oxide, zirconium oxide, or a composite oxide thereof is used. Alternatively, as the oxygen storage material, a rare-earth oxide such as praseodymium oxide, lanthanum oxide or yttrium oxide; a transition metal oxide such as iron oxide or manganese oxide; or a composite oxide thereof may be used. Alternatively, as the oxygen storage material, a mixture or composite oxide of the above-described compounds may be used. Typically, a composite oxide of cerium oxide and zirconium oxide, a composite oxide of cerium oxide, zirconium oxide, and lanthanum oxide, or a composite oxide of cerium oxide, zirconium oxide, lanthanum oxide, and yttrium oxide is used as the oxygen storage material.

The catalytic layer 3 may further contain a rare-earth element. The rare-earth element has a function of improving the $NO_x$ purification performance of the exhaust gas-purifying catalyst 1 without deteriorating the HC purification performance of the exhaust gas-purifying catalyst 1. As the rare-earth element, for example, neodymium, lanthanum, praseodymium or yttrium can be used.

The catalytic layer 3 may further contain zeolite. Zeolite has a large specific surface area, and has an excellent performance of adsorbing HC in the exhaust gas. Therefore, the HC purification performance of the exhaust gas-purifying catalyst 1 can be further improved by incorporating zeolite.

The catalytic layer 3 may further contain a binder. The binder plays a role in strengthening the bonds among a plurality of particles in the catalytic layer 3 to improve the endurance of the catalyst. As the binder, for example, an alumina sol, a titania sol, or a silica sol is used.

The exhaust gas-purifying catalyst 1 is not limited to an embodiment including one catalytic layer 3, and may include catalytic layers having a multilayer structure. For example, the exhaust gas-purifying catalyst 1 includes two to six catalytic layers. When the exhaust gas-purifying catalyst includes catalytic layers having a multilayer structure, at least one of the catalytic layers satisfies the following three requirements: (i) the catalytic layer contains a precious metal, alumina, and an acidic oxide element; (ii) a correlation coefficient $\rho_{Al,AE}$ calculated by the formula (1) is 0.70 or more; and (iii) a correlation coefficient $\rho_{PM,AE}$ calculated by the formula (7) is 0.70 or more.

Figure 3:
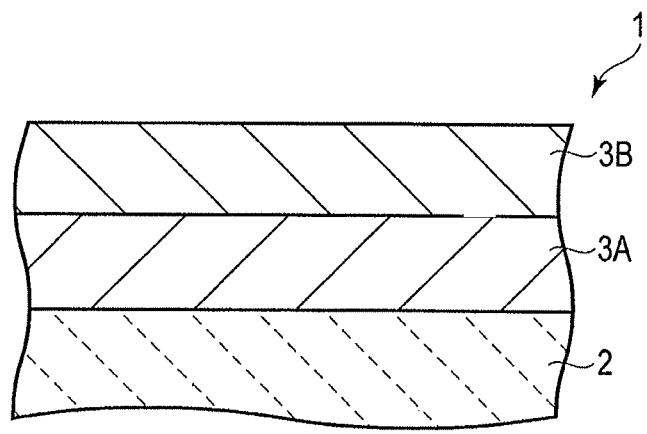
FIG. 3 is an enlarged cross-sectional view showing a part of an exhaust gas-purifying catalyst according to a second embodiment of the present invention.

FIG. 3 is a cross-sectional view schematically showing an exhaust gas-purifying catalyst according to a second embodiment of the present invention.

This exhaust gas-purifying catalyst 1 contains a substrate 2, a first catalytic layer 3A formed on the substrate 2, and a second catalytic layer 3B formed on the first catalytic layer 3A. The first catalytic layer 3A has the same structure as that of the catalytic layer 3 described with reference to FIG. 2. That is, the exhaust gas-purifying catalyst 1 has the same structure as that of the exhaust gas-purifying catalyst described with reference to FIG. 2 except that it further contains the second catalytic layer 3B.

The second catalytic layer 3B has a structure different from that of the first catalytic layer 3A.

Typically, the second catalytic layer 3B contains a precious metal. As the precious metal, typically used is a precious metal that is different from the precious metal contained in the first catalytic layer 3A. For example, in the case where the first catalytic layer 3A contains palladium and/or platinum as the precious metal, the second catalytic layer 3B typically contains rhodium. Alternatively, in the case where the first catalytic layer 3A contains rhodium as the precious metal, the second catalytic layer 3B typically contains palladium and/or platinum. When such a structure is employed, the performance of the exhaust gas-purifying catalyst 1 in purifying an exhaust gas can be further improved.

The second catalytic layer 3B may or may not satisfy the following three requirements as with the first catalytic layer 3A: (i) the catalytic layer contains a precious metal, alumina, and an acidic oxide element; (ii) the correlation coefficient $\rho_{Al,AE}$ calculated by the formula (1) is 0.70 or more; and (iii) the correlation coefficient $\rho_{PM,AE}$ calculated by the formula (7) is 0.70 or more.

When the second catalytic layer 3B satisfies the three requirements as with the first catalytic layer 3A, a higher performance in purifying exhaust gas can be exhibited.

The second catalytic layer 3B may further contain an oxygen storage material. As the oxygen storage material, the same material as that of the catalytic layer 3 of the exhaust gas-purifying catalyst 1 described with reference to FIG. 2 can be used.

The second catalytic layer 3B may further contain a rare-earth element, zeolite, or a binder. As these elements or materials, the same ones as those previously described for the catalytic layer 3 can be used.

Figure 4:
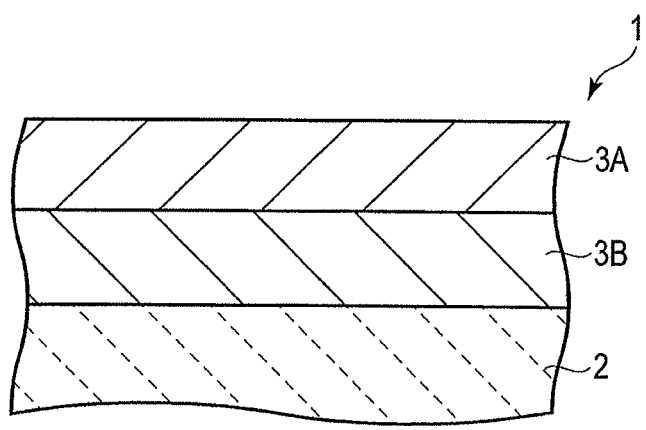
FIG. 4 is an enlarged cross-sectional view showing a part of an exhaust gas-purifying catalyst according to a third embodiment of the present invention.

FIG. 4 is a cross-sectional view schematically showing an exhaust gas-purifying catalyst according to a third embodiment of the present invention.

This exhaust gas-purifying catalyst 1 contains a substrate 2, a second catalytic layer 3B formed on the substrate 2, and a first catalytic layer 3A formed on the second catalytic layer 3B. That is, the exhaust gas-purifying catalyst 1 has the same structure as that of the exhaust gas-purifying catalyst described with reference to FIG. 3 except that the order of stacking the first catalytic layer 3A and the second catalytic layer 3B is reversed.

In the case where the structure described with reference to FIGS. 3 and 4 is employed, the uniformity of the distribution of the acidic oxide element and the proximity of the precious metal and acidic oxide element in each of the first catalytic layer 3A and the second catalytic layer 3B are evaluated as follows. Hereinafter, an example will be described in which the catalytic layers 3A and 3B are arranged as shown in FIG. 3.

First, supposed are 175 planes that are obtained by dividing the region between the surface of the first catalytic layer 3A located on the side of the second catalytic layer 3B and the surface of the first catalytic layer 3A located on the side of the substrate 2 into 175 equal parts. Then, measurements using EPMA are performed at 175 intersection points $P_j$ (j=1, 2, ..., 175) of the 175 planes and a straight line perpendicular to the main surface of the first catalytic layer 3A. Then, the correlation coefficients $\rho_{Al,AE}$ and $\rho_{PM,AE}$ are calculated for the first catalytic layer 3A by the same methods as those previously described for the catalytic layer 3.

Supposed are 175 planes that are obtained by dividing the region between the surface of the second catalytic layer 3B and the surface of the second catalytic layer 3B located on the side of the first catalytic layer 3A into 175 equal parts. Then, measurements using EPMA are performed at 175 intersection points $P_k$ (k=1, 2, ..., 175) of the 175 planes and a straight line perpendicular to the main surface of the second catalytic layer 3B. Then, the correlation coefficients $\rho_{Al,AE}$ and $\rho_{PM,AE}$ are calculated for the second catalytic layer 3B by the same methods as those previously described for the catalytic layer 3.

The exhaust gas-purifying catalyst 1 described with reference to FIGS. 3 and 4 includes the two catalytic layers, but at least the first catalytic layer 3A has a correlation coefficient $\rho_{Al,AE}$ of 0.7 or more and a correlation coefficient $\rho_{PM,AE}$ of 0.7 or more. The correlation coefficient $\rho_{Al,AE}$ of the first catalytic layer 3A is preferably 0.75 or more, and the correlation coefficient $\rho_{PM,AE}$ of the first catalytic layer 3A is preferably 0.75 or more.

EXAMPLES

Hereinafter, examples of the present invention will be described.

<Preparation of Alumina Doped with Acidic Oxide Element>

When an acidic oxide element was titanium, 35 g of titanium isopropoxide was first dissolved in 65 mL of n-propyl alcohol to prepare a titanium isopropoxide solution. Then, 90 g of aluminum nitrate and 5 g of citric acid were added to 210 mL of ion exchange water, and 100 ml of the prepared titanium isopropoxide solution was then added, followed by mixing. Next, 10 g of hydrazine was added to the mixed solution. Then, the obtained mixed solution was stirred at 50° C. for 24 hours to obtain a precipitate. The precipitate was separated by filtering to obtain a filter cake, and the obtained filter cake was dried. Then, the obtained solid was fired at 900° C. for 5 hours. Thus, alumina doped with 10% by mass of titanium was obtained.

The doped amount of the acidic oxide element was changed by changing the used amount of a raw material containing the acidic oxide element (titanium isopropoxide in the case of titanium). Herein, the doped amount (content) of the acidic oxide element is represented by % by mass based on the total of the mass of the alumina and the mass of the doped acidic oxide element.

When the acidic oxide element was tungsten, 11.2 g of ammonium tungstate was dissolved in 88.8 mL of n-propyl alcohol to prepare an ammonium tungstate solution, and the solution was used instead of the titanium isopropoxide solution. Except for this point, alumina doped with 10% by mass of tungsten was prepared in the same manner as in the case of the titanium.

When the acidic oxide element was silicon, 14.6 g of tetramethoxysilane was dissolved in 85.4 mL of n-propyl alcohol to prepare a tetramethoxysilane solution, and the solution was used instead of the titanium isopropoxide solution. Except for this point, alumina doped with 10% by mass of silicon was prepared in the same manner as in the case of the titanium.

Example 1: Manufacture of Catalyst C1

Alumina doped with 10% by mass of titanium was prepared. Hereinafter, this is referred to as "Ti alumina TI1".

A composite oxide of cerium oxide and zirconium oxide was prepared. In the composite oxide, the molar ratio of a cerium element and a zirconium element was set to 7:3. Hereinafter, the composite oxide is referred to as "CZ oxide".

In addition, a monolith honeycomb substrate was prepared, which was made of cordierite and had a total length of 100 mm, a volumetric capacity of 1.0 L and a cell number of 900 cells per square inch.

100 g of the Ti alumina TI1, 100 g of the CZ oxide, and a palladium nitrate aqueous solution containing 1 g of palladium were mixed to prepare a slurry. Hereinafter, the slurry is referred to as "slurry S1".

Next, 201 g (containing 1 g of palladium) of slurry S1 was applied on the substrate. Then, this was dried at 250° C. for 1 hour, and then fired at 500° C. for 1 hour.

As described above, an exhaust gas-purifying catalyst was manufactured. Hereinafter, the catalyst is referred to as "catalyst C1".

Example 2: Manufacture of Catalyst C2

Alumina doped with 0.5% by mass of titanium was prepared. Hereinafter, this is referred to as "Ti alumina TI2".

A slurry was prepared in the same manner as in the slurry S1 except that the Ti alumina TI2 was used instead of the Ti alumina TI1. Hereinafter, the slurry is referred to as "slurry S2".

Then, an exhaust gas-purifying catalyst was manufactured in the same manner as in the catalyst C1 except that the slurry S2 was used instead of the slurry S1. Hereinafter, the catalyst is referred to as "catalyst C2".

Example 3: Manufacture of Catalyst C3

Alumina doped with 20% by mass of titanium was prepared. Hereinafter, this is referred to as "Ti alumina TI3".

A slurry was prepared in the same manner as in the slurry S1 except that the Ti alumina TI3 was used instead of the Ti alumina TI1. Hereinafter, the slurry is referred to as "slurry S3".

Then, an exhaust gas-purifying catalyst was manufactured in the same manner as in the catalyst C1 except that the slurry S3 was used instead of the slurry S1. Hereinafter, the catalyst is referred to as "catalyst C3".

Example 4: Manufacture of Catalyst C4

A slurry was prepared in the same manner as in the slurry S3 except that 400 g of the Ti alumina TI3 was used instead of 100 g of the Ti alumina TI3, and that 50 g of the CZ oxide was used instead of 100 g of the CZ oxide. Hereinafter, the slurry is referred to as "slurry S4".

Then, an exhaust gas-purifying catalyst was manufactured in the same manner as in the catalyst C3 except that 451 g (containing 1 g of palladium) of the slurry S4 was used instead of 201 g (containing 1 g of palladium) of the slurry S3. Hereinafter, the catalyst is referred to as "catalyst C4".

Example 5: Manufacture of Catalyst C5

50 g of the Ti alumina TI1, 50 g of the CZ oxide, and a palladium nitrate aqueous solution containing 0.5 g of palladium were mixed to prepare a slurry. Hereinafter, the slurry is referred to as "slurry S5-1".

A composite oxide of zirconium oxide and cerium oxide was prepared. In the composite oxide, the molar ratio of a zirconium element and a cerium element was set to 7:3. Hereinafter, the composite oxide is referred to as "ZC oxide".

50 g of the Ti alumina TI1, 50 g of the ZC oxide, and a rhodium nitrate aqueous solution containing 0.5 g of rhodium were mixed to prepare a slurry. Hereinafter, the slurry is referred to as "slurry S5-2".

100.5 g (containing 0.5 g of palladium) of the slurry S5-1 was applied on the substrate. Then, this was dried at 250° C. for 1 hour, and then fired at 500° C. for 1 hour. Then, 100.5 g (containing 0.5 g of rhodium) of the slurry S5-2 was applied to the substrate on which the slurry S5-1 had been applied. Subsequently, this was dried at 250° C. for 1 hour, and then fired at 500° C. for 1 hour.

As described above, an exhaust gas-purifying catalyst was manufactured. Hereinafter, the catalyst is referred to as "catalyst C5".

Example 6: Manufacture of Catalyst C6

100.5 g (containing 0.5 g of rhodium) of the slurry S5-2 was applied on the substrate. Then, this was dried at 250° C. for 1 hour, and then fired at 500° C. for 1 hour. Then, 100.5 g (containing 0.5 g of palladium) of the slurry S5-1 was applied to the substrate on which the slurry S5-2 had been applied. Subsequently, this was dried at 250° C. for 1 hour, and then fired at 500° C. for 1 hour.

As described above, an exhaust gas-purifying catalyst was manufactured. That is, the exhaust gas-purifying catalyst was manufactured in the same manner as in the catalyst C5 except that the order of applying the slurry S5-1 and the slurry S5-2 was reversed. Hereinafter, the catalyst is referred to as "catalyst C6".

Example 7: Manufacture of Catalyst C7

A slurry was prepared in the same manner as in the slurry S1 except that a dinitrodiamine platinum nitrate aqueous solution containing 1 g of platinum was used instead of a palladium nitrate aqueous solution containing 1 g of palladium. Hereinafter, the slurry is referred to as "slurry S7".

Then, an exhaust gas-purifying catalyst was manufactured in the same manner as in the catalyst C1 except that the slurry S7 was used instead of the slurry S1. Hereinafter, the catalyst is referred to as "catalyst C7".

Example 8: Manufacture of Catalyst C8

A slurry was prepared in the same manner as in the slurry S1 except that an aqueous solution containing a mixture of palladium nitrate containing 0.5 g of palladium and dinitrodiamine platinum nitrate containing 0.5 g of platinum was used instead of a palladium nitrate aqueous solution containing 1 g of palladium. Hereinafter, the slurry is referred to as "slurry S8".

Then, an exhaust gas-purifying catalyst was manufactured in the same manner as in the catalyst C1 except that the slurry S8 was used instead of the slurry S1. Hereinafter, the catalyst is referred to as "catalyst C8".

Example 9: Manufacture of Catalyst C9

Alumina doped with 10% by mass of tungsten was prepared. Hereinafter, this is referred to as "W alumina".

A slurry was prepared in the same manner as in the slurry S1 except that the W alumina was used instead of the Ti alumina TI1. Hereinafter, the slurry is referred to as "slurry S9".

Then, an exhaust gas-purifying catalyst was manufactured in the same manner as in the catalyst C1 except that the slurry S9 was used instead of the slurry S1. Hereinafter, the catalyst is referred to as "catalyst C9".

Example 10: Manufacture of Catalyst C10

Alumina doped with 10% by mass of silicon was prepared. Hereinafter, this is referred to as "Si alumina".

A slurry was prepared in the same manner as in the slurry S1 except that the Si alumina was used instead of the Ti alumina TI1. Hereinafter, the slurry is referred to as "slurry S10".

Then, an exhaust gas-purifying catalyst was manufactured in the same manner as in the catalyst C1 except that the slurry S10 was used instead of the slurry S1. Hereinafter, the catalyst is referred to as "catalyst C10".

Example 11: Manufacture of Catalyst C11

A slurry was prepared in the same manner as in the slurry S1 except that a mixture of 50 g of the Ti alumina TI1 and 50 g of the W alumina was used instead of 100 g of the Ti alumina TI1. Hereinafter, the slurry is referred to as "slurry S11".

Then, an exhaust gas-purifying catalyst was manufactured in the same manner as in the catalyst C1 except that the slurry S11 was used instead of the slurry S1. Hereinafter, the catalyst is referred to as "catalyst C11".

Example 12: Manufacture of Catalyst C12

Alumina doped with 1% by mass of titanium was prepared. Hereinafter, this is referred to as "Ti alumina TI12".

A slurry was prepared in the same manner as in the slurry S1 except that the Ti alumina TI12 was used instead of the Ti alumina TI1. Hereinafter, the slurry is referred to as "slurry S12".

Then, an exhaust gas-purifying catalyst was manufactured in the same manner as in the catalyst C1 except that the slurry S12 was used instead of the slurry S1. Hereinafter, the catalyst is referred to as "catalyst C12".

Example 13: Manufacture of Catalyst C13

A slurry was manufactured in the same manner as in the slurry S1 except that 400 g of the Ti alumina TI1 was used instead of 100 g of the Ti alumina TI1, and that 50 g of the CZ oxide was used instead of 100 g of the CZ oxide. Hereinafter, the slurry is referred to as "slurry S13".

Then, an exhaust gas-purifying catalyst was manufactured in the same manner as in the catalyst C1 except that 451 g (containing 1 g of palladium) of the slurry S13 was used instead of 201 g (containing 1 g of palladium) of the slurry S1. Hereinafter, the catalyst is referred to as "catalyst C13".

Example 14: Manufacture of Catalyst C14

50 g of the Ti alumina TI12, 50 g of the CZ oxide (Ce/Zr molar ratio=7/3), and a palladium nitrate aqueous solution containing 0.5 g of palladium were mixed to prepare a slurry. Hereinafter, the slurry is referred to as "slurry S14-1".

50 g of the Ti alumina TI12, 50 g of the ZC oxide (Zr/Ce molar ratio=7/3), and a rhodium nitrate aqueous solution containing 0.5 g of rhodium were mixed to prepare a slurry. Hereinafter, the slurry is referred to as "slurry S14-2".

100.5 g (containing 0.5 g of palladium) of the slurry S14-1 was applied on the substrate. Then, this was dried at 250° C. for 1 hour, and then fired at 500° C. for 1 hour. Then, 100.5 g (containing 0.5 g of rhodium) of the slurry S14-2 was applied to the substrate on which the slurry S14-1 had been applied. Subsequently, this was dried at 250° C. for 1 hour, and then fired at 500° C. for 1 hour.

As described above, an exhaust gas-purifying catalyst was manufactured. Hereinafter, the catalyst is referred to as "catalyst C14".

Example 15: Manufacture of Catalyst C15

A composite oxide of cerium oxide, zirconium oxide, and lanthanum oxide was prepared. In the composite oxide, the molar ratio of a cerium element, a zirconium element, and a lanthanum element was set to 6:3:1. Hereinafter, the composite oxide is referred to as "CZL oxide".

A slurry was prepared in the same manner as in the slurry S1 except that the CZL oxide was used instead of the CZ oxide. Hereinafter, the slurry is referred to as "slurry S15".

Then, an exhaust gas-purifying catalyst was manufactured in the same manner as in the catalyst C1 except that the slurry S15 was used instead of the slurry S1. Hereinafter, the catalyst is referred to as "catalyst C15".

Example 16: Manufacture of Catalyst C16

A composite oxide of cerium oxide, zirconium oxide, lanthanum oxide, and yttrium oxide was prepared. In the composite oxide, the molar ratio of a cerium element, a zirconium element, a lanthanum element, and an yttrium element was set to 5:3:1:1. Hereinafter, the composite oxide is referred to as "CZLY oxide".

A slurry was prepared in the same manner as in the slurry S1 except that the CZLY oxide was used instead of the CZ oxide. Hereinafter, the slurry is referred to as "slurry S16".

Then, an exhaust gas-purifying catalyst was manufactured in the same manner as in the catalyst C1 except that the slurry S16 was used instead of the slurry S1. Hereinafter, the catalyst is referred to as "catalyst C16".

Example 17: Manufacture of Catalyst C17

Alumina doped with 0.05% by mass of titanium was prepared. Hereinafter, this is referred to as "Ti alumina TI17".

A slurry was prepared in the same manner as in the slurry S1 except that the Ti alumina TI17 was used instead of the Ti alumina TI1. Hereinafter, the slurry is referred to as "slurry S17".

Then, an exhaust gas-purifying catalyst was manufactured in the same manner as in the catalyst C1 except that the slurry S17 was used instead of the slurry S1. Hereinafter, the catalyst is referred to as "catalyst C17".

Example 18: Manufacture of Catalyst C18

Alumina doped with 21% by mass of titanium was prepared. Hereinafter, this is referred to as "Ti alumina TI18".

A slurry was prepared in the same manner as in the slurry S1 except that 400 g of the Ti alumina TI18 was used instead of 100 g of the Ti alumina TI1, and that 50 g of the CZ oxide was used instead of 100 g of the CZ oxide. Hereinafter, the slurry is referred to as "slurry S18".

Then, an exhaust gas-purifying catalyst was manufactured in the same manner as in the catalyst C1 except that 451 g (containing 1 g of palladium) of the slurry S18 was used instead of 201 g (containing 1 g of palladium) of the slurry S1. Hereinafter, the catalyst is referred to as "catalyst C18".

Example 19: Manufacture of Catalyst C19

90 g of alumina, 100 g of the CZ oxide, 16.7 g of titanium oxide, and a palladium nitrate aqueous solution containing 1 g of palladium were mixed to prepare a slurry. Hereinafter, the slurry is referred to as "slurry S19".

Then, an exhaust gas-purifying catalyst was manufactured in the same manner as in the catalyst C1 except that 207.7 g (containing 1 g of palladium) of the slurry S19 was used instead of 201 g (containing 1 g of palladium) of the slurry S1. Hereinafter, the catalyst is referred to as "catalyst C19".

In the catalyst C19, the mass of titanium based on the total mass of alumina and titanium was 10% by mass.

Example 20: Manufacture of Catalyst C20

45 g of alumina, 50 g of the CZ oxide, 8.35 g of titanium oxide, and a palladium nitrate aqueous solution containing 0.5 g of palladium were mixed to prepare a slurry. Hereinafter, the slurry is referred to as "slurry S20-1".

45 g of alumina, 50 g of the CZ oxide, 8.35 g of titanium oxide, and a rhodium nitrate aqueous solution containing 0.5 g of rhodium were mixed to prepare a slurry. Hereinafter, the slurry is referred to as "slurry S20-2".

103.85 g (containing 0.5 g of palladium) of the slurry S20-1 was applied on the substrate. Then, this was dried at 250° C. for 1 hour, and then fired at 500° C. for 1 hour. Then, 103.85 g (containing 0.5 g of rhodium) of the slurry S20-2 was applied to the substrate on which the slurry S20-1 had been applied. Subsequently, this was dried at 250° C. for 1 hour, and then fired at 500° C. for 1 hour.

As described above, an exhaust gas-purifying catalyst was manufactured. Hereinafter, the catalyst is referred to as "catalyst C20".

Example 21: Manufacture of Catalyst C21

An exhaust gas-purifying catalyst was manufactured in the same manner as in the catalyst C20 except that 103.85 g (containing 0.5 g of palladium) of the slurry S20-1 was applied, and 100.5 g (containing 0.5 g of rhodium) of the slurry S5-2 was then applied. Hereinafter, the catalyst is referred to as "catalyst C21".

Example 22: Manufacture of Catalyst C22

An exhaust gas-purifying catalyst was manufactured in the same manner as in the catalyst C20 except that 100.5 g (containing 0.5 g of palladium) of the slurry S5-1 was applied, and 103.85 g (containing 0.5 g of rhodium) of the slurry S20-2 was then applied. Hereinafter, the catalyst is referred to as "catalyst C22".

Data related to the catalysts C1 to C22 are summarized in the following Tables 1 to 6.

TABLE 1

| Catalyst | Catalytic layer | Acidic oxide element | Amount of acidic oxide element (g/L) | Doped amount of acidic oxide element (% by mass) | Precious metal | Amount of precious metal (g/L) | Correlation coefficient $\rho_{Al,AE}$ | Correlation coefficient $\rho_{PM,AE}$ | Emission of evaluation 1 NMHC (g/km) | CO (g/km) | $NO_X$ (g/km) |
|---|---|---|---|---|---|---|---|---|---|---|---|
| C1 | | Ti | 10 | 10 | Pd | 1 | 0.81 | 0.82 | 0.017 | 0.132 | 0.022 |
| C2 | | Ti | 0.5 | 0.5 | Pd | 1 | 0.75 | 0.74 | 0.019 | 0.138 | 0.024 |
| C3 | | Ti | 20 | 20 | Pd | 1 | 0.78 | 0.78 | 0.019 | 0.138 | 0.024 |
| C4 | | Ti | 80 | 20 | Pd | 1 | 0.76 | 0.77 | 0.020 | 0.143 | 0.030 |
| C5 | Upper layer | Ti | 5 | 10 | Rh | 0.5 | 0.80 | 0.81 | 0.022 | 0.112 | 0.011 |
| | Lower layer | Ti | 5 | 10 | Pd | 0.5 | 0.81 | 0.80 | | | |
| C6 | Upper layer | Ti | 5 | 10 | Pd | 0.5 | 0.80 | 0.80 | 0.020 | 0.117 | 0.013 |
| | Lower layer | Ti | 5 | 10 | Rh | 0.5 | 0.80 | 0.81 | | | |
| C7 | | Ti | 10 | 10 | Pt | 1 | 0.79 | 0.78 | 0.021 | 0.140 | 0.031 |
| C8 | | Ti | 10 | 10 | Pd | 0.5 | 0.81 | 0.80 | 0.019 | 0.127 | 0.020 |
| | | | | | Pt | 0.5 | | | | | |

TABLE 2

| Catalyst | Catalytic layer | Acidic oxide element | Amount of acidic oxide element (g/L) | Doped amount of acidic oxide element (% by mass) | Precious metal | Amount of precious metal (g/L) | Correlation coefficient $\rho_{Al,AE}$ | Correlation coefficient $\rho_{PM,AE}$ | Emission of evaluation 1 NMHC (g/km) | CO (g/km) | $NO_X$ (g/km) |
|---|---|---|---|---|---|---|---|---|---|---|---|
| C9 | | W | 10 | 10 | Pd | 1 | 0.80 | 0.81 | 0.021 | 0.140 | 0.028 |
| C10 | | Si | 10 | 10 | Pd | 1 | 0.79 | 0.78 | 0.024 | 0.143 | 0.034 |
| C11 | | Ti | 5 | 10 | Pd | 1 | 0.80 | 0.80 | 0.018 | 0.133 | 0.023 |
| | | W | 5 | 10 | | | | | | | |
| C12 | | Ti | 1 | 1 | Pd | 1 | 0.80 | 0.80 | 0.017 | 0.123 | 0.021 |
| C13 | | Ti | 40 | 10 | Pd | 1 | 0.79 | 0.78 | 0.017 | 0.126 | 0.022 |
| C14 | Upper layer | Ti | 0.5 | 1 | Rh | 0.5 | 0.79 | 0.78 | 0.024 | 0.113 | 0.013 |
| | Lower layer | Ti | 0.5 | 1 | Pd | 0.5 | 0.80 | 0.80 | | | |
| C15 | | Ti | 10 | 10 | Pd | 1 | 0.81 | 0.82 | 0.012 | 0.103 | 0.014 |
| C16 | | Ti | 10 | 10 | Pd | 1 | 0.82 | 0.81 | 0.010 | 0.099 | 0.011 |

TABLE 3

| Catalyst | Catalytic layer | Acidic oxide element | Amount of acidic oxide element (g/L) | Doped amount of acidic oxide element (% by mass) | Precious metal | Amount of precious metal (g/L) | Correlation coefficient $\rho_{Al,AE}$ | Correlation coefficient $\rho_{PM,AE}$ | Emission of evaluation 1 NMHC (g/km) | CO (g/km) | $NO_X$ (g/km) |
|---|---|---|---|---|---|---|---|---|---|---|---|
| C17 | | Ti | 0.05 | 0.05 | Pd | 1 | 0.71 | 0.70 | 0.028 | 0.156 | 0.039 |
| C18 | | Ti | 84 | 21 | Pd | 1 | 0.70 | 0.71 | 0.028 | 0.155 | 0.037 |
| C19 | | Ti | 10 | 0 | Pd | 1 | 0.59 | 0.58 | 0.045 | 0.187 | 0.070 |
| C20 | Upper layer | Ti | 5 | 0 | Rh | 0.5 | 0.58 | 0.58 | 0.046 | 0.190 | 0.069 |
| | Lower layer | Ti | 5 | 0 | Pd | 0.5 | 0.59 | 0.57 | | | |
| C21 | Upper layer | Ti | 5 | 10 | Rh | 0.5 | 0.80 | 0.80 | 0.030 | 0.151 | 0.045 |
| | Lower layer | Ti | 5 | 0 | Pd | 0.5 | 0.58 | 0.59 | | | |
| C22 | Upper layer | Ti | 5 | 0 | Rh | 0.5 | 0.57 | 0.57 | 0.031 | 0.153 | 0.040 |
| | Lower layer | Ti | 5 | 10 | Pd | 0.5 | 0.80 | 0.81 | | | |

TABLE 4

| Catalyst | Catalytic layer | Acidic oxide element | Amount of acidic oxide element (g/L) | Doped amount of acidic oxide element (% by mass) | Precious metal | Amount of precious metal (g/L) | Correlation coefficient $\rho_{Al,AE}$ | Correlation coefficient $\rho_{PM,AE}$ | Emission of evaluation 2 NMHC (g/km) | CO (g/km) | $NO_X$ (g/km) |
|---|---|---|---|---|---|---|---|---|---|---|---|
| C1 | | Ti | 10 | 10 | Pd | 1 | 0.81 | 0.82 | 0.045 | 0.317 | 0.065 |
| C2 | | Ti | 0.5 | 0.5 | Pd | 1 | 0.75 | 0.74 | 0.068 | 0.442 | 0.126 |
| C3 | | Ti | 20 | 20 | Pd | 1 | 0.78 | 0.78 | 0.050 | 0.330 | 0.073 |
| C4 | | Ti | 80 | 20 | Pd | 1 | 0.76 | 0.77 | 0.075 | 0.480 | 0.120 |
| C5 | Upper layer | Ti | 5 | 10 | Rh | 0.5 | 0.80 | 0.81 | 0.079 | 0.359 | 0.044 |
| | Lower layer | Ti | 5 | 10 | Pd | 0.5 | 0.81 | 0.80 | | | |
| C6 | Upper layer | Ti | 5 | 10 | Pd | 0.5 | 0.80 | 0.80 | 0.071 | 0.373 | 0.053 |
| | Lower layer | Ti | 5 | 10 | Rh | 0.5 | 0.80 | 0.81 | | | |
| C7 | | Ti | 10 | 10 | Pt | 1 | 0.79 | 0.78 | 0.077 | 0.456 | 0.125 |
| C8 | | Ti | 10 | 10 | Pd Pt | 0.5 0.5 | 0.81 | 0.80 | 0.067 | 0.405 | 0.079 |

TABLE 5

| Catalyst | Catalytic layer | Acidic oxide element | Amount of acidic oxide element (g/L) | Doped amount of acidic oxide element (% by mass) | Precious metal | Amount of precious metal (g/L) | Correlation coefficient $\rho_{Al,AE}$ | Correlation coefficient $\rho_{PM,AE}$ | Emission of evaluation 2 NMHC (g/km) | CO (g/km) | $NO_X$ (g/km) |
|---|---|---|---|---|---|---|---|---|---|---|---|
| C9 | | W | 10 | 10 | Pd | 1 | 0.80 | 0.81 | 0.076 | 0.448 | 0.112 |
| C10 | | Si | 10 | 10 | Pd | 1 | 0.79 | 0.78 | 0.086 | 0.458 | 0.136 |
| C11 | | Ti W | 5 5 | 10 10 | Pd | 1 | 0.80 | 0.80 | 0.065 | 0.426 | 0.092 |
| C12 | | Ti | 1 | 1 | Pd | 1 | 0.80 | 0.80 | 0.062 | 0.400 | 0.085 |
| C13 | | Ti | 40 | 10 | Pd | 1 | 0.79 | 0.78 | 0.061 | 0.403 | 0.088 |
| C14 | Upper layer | Ti | 0.5 | 1 | Rh | 0.5 | 0.79 | 0.78 | 0.086 | 0.362 | 0.053 |
| | Lower layer | Ti | 0.5 | 1 | Pd | 0.5 | 0.80 | 0.80 | | | |
| C15 | | Ti | 10 | 10 | Pd | 1 | 0.81 | 0.82 | 0.043 | 0.330 | 0.056 |
| C16 | | Ti | 10 | 10 | Pd | 1 | 0.82 | 0.81 | 0.037 | 0.320 | 0.044 |

TABLE 6

| Catalyst | Catalytic layer | Acidic oxide element | Amount of acidic oxide element (g/L) | Doped amount of acidic oxide element (% by mass) | Precious metal | Amount of precious metal (g/L) | Correlation coefficient $\rho_{Al,AE}$ | Correlation coefficient $\rho_{PM,AE}$ | Emission of evaluation 2 NMHC (g/km) | CO (g/km) | NO$_X$ (g/km) |
|---|---|---|---|---|---|---|---|---|---|---|---|
| C17 | | Ti | 0.05 | 0.05 | Pd | 1 | 0.71 | 0.70 | 0.111 | 0.562 | 0.210 |
| C18 | | Ti | 84 | 21 | Pd | 1 | 0.70 | 0.71 | 0.113 | 0.560 | 0.195 |
| C19 | | Ti | 10 | 0 | Pd | 1 | 0.59 | 0.58 | 0.236 | 0.868 | 0.406 |
| C20 | Upper layer | Ti | 5 | 0 | Rh | 0.5 | 0.58 | 0.58 | 0.231 | 0.840 | 0.370 |
| | Lower layer | Ti | 5 | 0 | Pd | 0.5 | 0.59 | 0.57 | | | |
| C21 | Upper layer | Ti | 5 | 10 | Rh | 0.5 | 0.80 | 0.80 | 0.152 | 0.650 | 0.224 |
| | Lower layer | Ti | 5 | 0 | Pd | 0.5 | 0.58 | 0.59 | | | |
| C22 | Upper layer | Ti | 5 | 0 | Rh | 0.5 | 0.57 | 0.57 | 0.155 | 0.643 | 0.201 |
| | Lower layer | Ti | 5 | 10 | Pd | 0.5 | 0.80 | 0.81 | | | |

In each of Tables 1 to 6, the column "Amount of acidic oxide element (g/L)" describes the mass of the acidic oxide element per the unit volume of the substrate. The column "Doped amount of acidic oxide element (% by mass)" describes the doped amount of the acidic oxide element based on the total mass of the alumina and the acidic oxide element. The column "Amount of precious metal" describes the mass of the precious metal per the unit volume of the substrate.

<Evaluation of Dispersibility of Acidic Oxide Element in Catalytic Layer>

The above-mentioned correlation coefficient $\rho_{Al,AE}$ was obtained as follows for each of the catalysts C1 to C22.

First, each of the catalysts C1 to C22 was cut to a cube shape of 1 cm×1 cm×1 cm to produce a sample for EPMA measurement. Each of 350 points Pi (i=1, 2, . . . , 350) determined as described above was subjected to EPMA measurement. When the catalytic layer had a double-layered structure, each of 175 points $P_j$ and 175 points $P_k$ (j=1, 2, . . . , 175; k=j=1, 2, . . . , 175) was subjected to EPMA measurement. Specifically, in each of these points, characteristic X-ray intensity $I_{Al,i}$ of aluminum or characteristic X-ray intensities $I_{Al,j}$ and $I_{Al,k}$ of aluminum, and characteristic X-ray intensity $I_{AE,i}$ of an acidic oxide element or characteristic X-ray intensities $I_{AE,j}$ and $I_{AE,k}$ of an acidic oxide element were measured. Based on the above-mentioned formulae, the correlation coefficient $\rho_{Al,AE}$ of the catalytic layer included in each of the catalysts was calculated. The correlation coefficients $\rho_{Al,AE}$ thus obtained are shown in the above-mentioned Tables 1 to 6.

<Evaluation of Proximity of Precious Metal and Acidic Oxide Element in Catalytic Layer>

The above-mentioned correlation coefficient $\rho_{PM,AE}$ was obtained as follows for each of the catalysts C1 to C22.

First, each of the catalysts C1 to C22 was cut to a cube shape of 1 cm×1 cm×1 cm to produce a sample for EPMA measurement. Each of 350 points $P_i$ (i=1, 2, . . . , 350) determined as described above was subjected to EPMA measurement. When the catalytic layer had a double-layered structure, each of 175 points $P_j$ and 175 points $P_k$ (j=1, 2, . . . , 175; k=j=1, 2, . . . , 175) was subjected to EPMA measurement. Specifically, in each of the points, characteristic X-ray intensity $I_{PM,i}$ of a precious metal or characteristic X-ray intensities $I_{PM,j}$ and $I_{PM,k}$ of a precious metal, and characteristic X-ray intensity $I_{AE,i}$ of an acidic oxide element or characteristic X-ray intensities $I_{AE,j}$ and $I_{AE,k}$ of an acidic oxide element were measured.

Based on the above-mentioned formulae, the correlation coefficient $\rho_{PM,AE}$ of the catalytic layer included in each of the catalysts was calculated. The correlation coefficients $\rho_{PM,AE}$ thus obtained are shown in the above-mentioned Tables 1 to 6.

<Evaluation of Exhaust Gas-Purification Performance>

Evaluation 1:

First, an endurance test corresponding to driving of 80,000 km was performed for each of the catalysts C1 to C22. Then, each of them was mounted on an actual vehicle having an engine with a piston displacement of 1.5 L. Subsequently, the actual vehicle was driven on JC08C mode (JC08 mode by cold start) and JC08H mode (JC08 mode by hot start) using gasoline containing 100 ppm of sulfur, and the emissions of non-methane hydrocarbons (NMHC), CO and NO$_X$ were measured in each mode. Then, the emissions obtained in each mode were substituted into the following formula, and a combined value of the emissions of NMHC, CO and NO$_X$ by JC08 mode was obtained.

$$E = 0.25 \times E_c + 0.75 \times E_H$$

In the formula, E is the combined value of the emissions of the respective exhaust gases by JC08 mode; $E_C$ is the measurement value of the emission of the respective exhaust gas by JC08C mode; and $E_H$ is the measurement value of the emission of the respective exhaust gas by JC08H mode. The combined values of the emissions of the respective exhaust gases thus obtained are shown in the columns of "emission of evaluation 1" in Tables 1 to 3 above.

Evaluation 2:

The catalysts C1 to C22 were evaluated according to the same evaluation method as that in the evaluation 1 except that gasoline containing 1000 ppm of sulfur was used instead of gasoline containing 100 ppm of sulfur. The combined values of the emissions of the respective exhaust gases are shown in the columns of "emission of evaluation 2" in Tables 4 to 6 above.

<Results>

As is apparent from Tables 1 to 3, the catalysts C1 to C18, C21 and C22 had a higher performance in purifying exhaust gas than that of the catalysts C19 and C20. Similarly, as is apparent from Tables 4 to 6, the catalysts C1 to C18, C21, and C22 had a higher performance in purifying exhaust gas than that of the catalysts C19 and C20.

These results show that when at least one of the catalytic layers has a correlation coefficient $\rho_{Al,AE}$ of 0.7 or more and a correlation coefficient $\rho_{PM,AE}$ of 0.7 or more, the acidic oxide element is present close to the precious metal supported on the alumina particle, which enables the sulfur poisoning of the precious metal to be efficiently suppressed.

FIG. 5 shows the relationship between the amount of titanium per the unit volume of the substrate and the $NO_x$ emission for the results obtained in the evaluation 1. FIG. 6 shows the relationship between the amount of titanium per the unit volume of the substrate and the $NO_x$ emission for the results obtained in the evaluation 2. The $NO_x$ emissions of the catalysts C1 to C4, C12, C13, and C17 to C19 are shown in FIGS. 5 and 6.

As is apparent from FIGS. 5 and 6, a particularly high performance in purifying $NO_x$ could be achieved by setting the amount of titanium per the unit volume of the substrate to be within a range of from 0.5 g/L to 80 g/L. A higher performance in purifying $NO_x$ could be achieved by setting the amount of titanium per the unit volume of the substrate to be within a range of 1 g/L to 40 g/L.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:
1. An exhaust gas-purifying catalyst comprising:
a substrate, and one or more catalytic layers provided on the substrate,
wherein at least one of the catalytic layers consists of:
a precious metal,
an acidic oxide element,
an alumina doped with the acidic oxide element,
optionally at least one oxygen storage material selected from the group consisting of cerium oxide, zirconium oxide, a rare-earth oxide, a transition metal oxide, and a mixture or composite oxide thereof,
optionally a rare-earth element,
optionally zeolite, and
optionally at least one binder selected from the group consisting of alumina, titania, and silica;
the at least one of the catalytic layers has a correlation coefficient $\rho_{Al,AE}$ calculated by the following formula (1) of 0.70 or more; and the at least one of the catalytic layers has a correlation coefficient $\rho_{PM,AE}$ calculated by the following formula (7) of 0.70 or more,

$$\rho_{Al,AE} = \frac{C_{Al,AE}}{\sigma_{Al}\sigma_{AE}} \tag{1}$$

wherein $C_{Al,AE}$, $\sigma_{Al}$, and $\sigma_{AE}$ in the formula (1) are represented by the following formulae (2), (3) and (4), respectively:

$$C_{Al,AE} = \frac{1}{350}\sum_{i=1}^{350}(I_{Al,i} - I_{Al,av})(I_{AE,i} - I_{AE,av}) \tag{2}$$

$$\sigma_{Al} = \sqrt{\frac{1}{350}\sum_{i=1}^{350}(I_{Al,i} - I_{Al,av})^2} \tag{3}$$

$$\sigma_{AE} = \sqrt{\frac{1}{350}\sum_{i=1}^{350}(I_{AE,i} - I_{AE,av})^2} \tag{4}$$

in the formulae (2) to (4),
i is a natural number of from 1 to 350,
$I_{Al,i}$ is a characteristic X-ray intensity of aluminum measured using an electron beam microanalyzer at an i-th intersection point among 350 intersection points of planes and a line perpendicular to a main surface of the catalytic layer, the planes being obtained by dividing the catalytic layer into 350 equal parts in a thickness direction,
$I_{Al,av}$ is an arithmetic average value of the $I_{Al,i}$ calculated by the following formula (5):

$$I_{Al,av} = \frac{1}{350}\sum_{i=1}^{350} I_{Al,i} \tag{5}$$

$I_{AE,i}$ is a characteristic X-ray intensity of the acidic oxide element measured using the electron beam microanalyzer at the i-th intersection point, and
$I_{AE,av}$ is an arithmetic average value of the $I_{AE,i}$ calculated by the following formula (6):

$$I_{AE,av} = \frac{1}{350}\sum_{i=1}^{350} I_{AE,i}; \tag{6}$$

and $$\rho_{PM,AE} = \frac{C_{PM,AE}}{\sigma_{PM}\sigma_{AE}} \tag{7}$$

wherein $C_{PM,AE}$, $\sigma_{PM}$ and $\sigma_{AE}$ in the formula (7) are represented by the following formulae (8), (9) and (10), respectively:

$$C_{PM,AE} = \frac{1}{350}\sum_{i=1}^{350}(I_{PM,i} - I_{PM,av})(I_{AE,i} - I_{AE,av}) \tag{8}$$

$$\sigma_{PM} = \sqrt{\frac{1}{350}\sum_{i=1}^{350}(I_{PM,i} - I_{PM,av})^2} \tag{9}$$

$$\sigma_{AE} = \sqrt{\frac{1}{350}\sum_{i=1}^{350}(I_{AE,i} - I_{AE,av})^2} \tag{10}$$

in the formulae (8) to (10),
i is a natural number of from 1 to 350,
$I_{PM,i}$ is a characteristic X-ray intensity of the precious metal measured using the electron beam microanalyzer at the i-th intersection point among 350 intersection points of planes and a line perpendicular to a main surface of the catalytic layer, the planes being obtained by dividing the catalytic layer into 350 equal parts in a thickness direction,
$I_{PM,av}$ is an arithmetic average value of the $I_{PM,i}$ calculated by the following formula (11):

$$I_{PM,av} = \frac{1}{350}\sum_{i=1}^{350} I_{PM,i} \qquad (11)$$

$I_{AE,i}$ is a characteristic X-ray intensity of the acidic oxide element measured using the electron beam microanalyzer at the i-th intersection point, and $I_{AE,av}$ is an arithmetic average value of the $I_{AE,i}$ calculated by the following formula (12):

$$I_{AE,av} = \frac{1}{350}\sum_{i=1}^{350} I_{AE,i}. \qquad (12)$$

2. The exhaust gas-purifying catalyst according to claim 1, wherein the one or more catalytic layers are catalytic layers having a multilayer structure.

3. The exhaust gas-purifying catalyst according to claim 1, wherein the acidic oxide element is titanium, tungsten, or silicon.

4. The exhaust gas-purifying catalyst according to claim 1, wherein a content of the acidic oxide element per a unit volume of the substrate is within a range of from 0.5 g/L to 80 g/L.

5. The exhaust gas-purifying catalyst according to claim 4, wherein the content of the acidic oxide element per the unit volume of the substrate is within a range of from 1 g/L to 40 g/L.

6. The exhaust gas-purifying catalyst according to claim 1, wherein a content of the acidic oxide element is within a range of from 0.5% by mass to 20% by mass based on a total mass of the alumina and the acidic oxide element.

7. The exhaust gas-purifying catalyst according to claim 6, wherein the content of the acidic oxide element is within a range of from 1% by mass to 10% by mass based on the total mass of the alumina and the acidic oxide element.

8. The exhaust gas-purifying catalyst according to claim 1, wherein a mass ratio of a content of the acidic oxide element to a content of the precious metal is within a range of from 0.5 to 80.

9. The exhaust gas-purifying catalyst according to claim 8, wherein the mass ratio of the content of the acidic oxide element to the content of the precious metal is within a range of from 0.5 to 40.

* * * * *